(12) United States Patent
Szpak et al.

(10) Patent No.: US 7,367,012 B2
(45) Date of Patent: *Apr. 29, 2008

(54) GENERATING CODE FOR DATA REFERENCES

(75) Inventors: Peter Szpak, Newton, MA (US); Matthew Englehart, Olmsted Falls, OH (US)

(73) Assignee: The MathWorks, Inc., Natick, MA (US)

(*) Notice: Subject to any disclaimer, the term of this patent is extended or adjusted under 35 U.S.C. 154(b) by 693 days.

This patent is subject to a terminal disclaimer.

(21) Appl. No.: 09/876,487

(22) Filed: Jun. 7, 2001

(65) Prior Publication Data

US 2002/0188928 A1 Dec. 12, 2002

(51) Int. Cl.
G06F 9/44 (2006.01)
(52) U.S. Cl. ........................... 717/106; 717/105
(58) Field of Classification Search ......... 717/104–109
See application file for complete search history.

(56) References Cited

U.S. PATENT DOCUMENTS

| | | | | |
|---|---|---|---|---|
| 5,978,581 | A * | 11/1999 | Sadiq et al. | 717/104 |
| 6,023,578 | A * | 2/2000 | Birsan et al. | 717/105 |
| 6,199,195 | B1 * | 3/2001 | Goodwin et al. | 717/104 |
| 6,212,672 | B1 * | 4/2001 | Keller et al. | 717/104 |
| 6,321,374 | B1 * | 11/2001 | Choy | 717/106 |
| 6,609,130 | B1 * | 8/2003 | Saulpaugh et al. | 707/102 |
| 6,651,240 | B1 * | 11/2003 | Yamamoto et al. | 717/108 |
| 2002/0174417 | A1 * | 11/2002 | Sijacic et al. | 717/147 |
| 2003/0016206 | A1 * | 1/2003 | Taitel | 345/103 |
| 2004/0031015 | A1 * | 2/2004 | Ben-Romdhane et al. | 717/107 |

OTHER PUBLICATIONS

David E. Langworthy and Stanley B. Zdonik, "Storage Class Extensibility in the Brown Object Storage System", May 1994, Brown University, Technical Report CS-94-22.*
"Simulink: Target Language Compiler Reference Guide", May 1997, The MathWorks Inc., Chapters 1-3.*
"Real-Time Workshop: User's Guide", Jan. 1998, The MathWorks Inc., Preface and Chapter 1.*
"Simulink: Writing S-Functions", Oct. 1998, The MathWorks Inc., Chapter 4.*
"Computer User's Dictionary", 1998, Microsoft Press, ISBN: 1-57231-862-7, pp 18, 55, 56, 166, 192, 224, 267, 281, 289, 303, 314, 319.*

(Continued)

Primary Examiner—Tuan Dam
Assistant Examiner—Derek J. Rutten
(74) Attorney, Agent, or Firm—Lahive & Cockfield, LLP

(57) ABSTRACT

A method includes specifying a model, the model including data having internal pre-defined data storage classes and external custom data storage classes and generating software source code for the model with a code generator using the internal predefined data storage classes and the external custom data storage classes. A system includes an application programming interface (API), the API adapted to receive user input for generating an external custom data storage class and an interpreted programming language process, the interpreted programming language process generating a set of instructions from the user input to an automatic code generator to generate code corresponding to data declared as the external custom data storage class in the automatic code generator.

16 Claims, 4 Drawing Sheets

OTHER PUBLICATIONS

Sztipanovits and Karsai, "Model-Integrated Computing", Apr. 1997, Computer, vol.: 30, Issue: 4, pp. 110-111.*

Jersak, M.; Ying Cai; Ziegenbein, D.; Ernst, R.;, "A transformational approach to constraint relaxation of a time-driven simulation model", Sep. 2000, Proceedings of The 13th International Symposium on System Synthesis, pp. 137-142.*

Herbert Schildt, "C/C++Programmer's Reference", 2000, McGraw-Hill, ISBN 0-07-212706-6, pp. 12 and 13.*

Englehart, M., "ACSL Code a high quality code generator for control applications", Proceedings of the 1996 IEEE International Symposium on Computer-Aided Control System Design, Sep. 1996, pp. 477-482.*

Englehart, M.; Jackson, M.;, "ControlH: an algorithm specification language and code generator", Apr. 1995, IEEE Control Systems Magazine, vol. 15, Issue: 2, pp. 54-64.*

* cited by examiner

GENERATING CODE FOR DATA REFERENCES

TECHNICAL FIELD

This invention relates to generating code for data references.

BACKGROUND

Automatic code generation is a process whereby software source code is automatically produced from a model of a dynamic system. The software source code produced by the automatic code generation process may be compiled and then executed on a digital computer, implementing the functionality specified by the model.

Data is an integral part of any system's model. Data can be used to represent the states of the system, as well as the flow of matter, energy, or information between system components. Each item of data in the model is defined to have a data storage class. Data is in turn represented in software source code in a manner that is prescribed by its storage class through direct or indirect access to memory through variables and functions.

Software source code references data in a variety of ways. For example, software source code may define data, declare data, initialize data, read a value of data, assign the value of data, and so forth.

SUMMARY

According to one aspect of the invention, a method includes specifying a block diagram model, the block diagram modeling including data having internal pre-defined data storage classes and external custom data storage classes and generating software source code for the block diagram model with a code generator using the internal predefined data storage classes and the external custom data storage classes.

One or more of the following features may also be included. A user defines the external custom data storage classes. The method may further include compiling the software source code into executable code and executing the executable code on a target processor.

Generating includes applying a fixed set of software instructions inherent in the code generator to the pre-defined data storage classes and applying an external set of software instructions to the external custom data storage classes. The external set of software instructions is accessed by the code generator through an application program interface (API). The API interface includes an interpreted programming language. The interpreted program language includes a data definition process. The data definition process includes receiving a set of instructions for each type of reference to the external custom data storage classes. The software source code is C.

According to another aspect of the invention, a system includes an application programming interface (API), the API adapted to receive user input for generating an external custom data storage class and an interpreted programming language process, the interpreted programming language process generating a set of instructions from the user input to an automatic code generator to generate code corresponding to data declared as the external custom data storage class in the automatic code generator.

One or more of the following features may also be included. The interpreted programming language is ASCII-based. The system may further include a set of pre-defined instructions inherent in the automatic code generator to generate code corresponding to data declared as an internal pre-defined data storage class in the automatic code generator. The code is C programming language. The system may further include a compiler for compiling the code for a target processor.

According to another aspect of the invention, a custom data storage class includes a set of instructions defined by a user that detail how to generate software source code for each type of reference to data that is of that class.

One or more of the following features may also be included. The set of instructions are used in conjunction with items of data declared in a model of a dynamic system.

Embodiments of the invention may have one or more of the following advantages.

A user can customize the way in which an automatic code generator generates software code referencing data.

The user may change the way software code is generated for a data item simply by changing its storage class from one custom class to another. In this manner the custom storage class is a concise mechanism for controlling the form of software code generation for a data item.

The custom storage class is a convenient, central point for software code generation of a set of objects since changes to the unique set of instructions defining a custom storage class collectively apply to the (potentially large) set of data of that class.

While the code generation instructions corresponding to a custom storage class may be arbitrarily complex, leading to an infinite set of variations, the set of storage classes defined for a given model is a finite set, constraining the variations to a well-defined, intentional, finite set that is appropriate and desired for that model.

The instructions corresponding to a given custom storage class may be a function of the set of items that are defined to be of that class, so that the mechanism is self-referential.

Common software engineering practices that are enabled with custom storage classes include embedding a data item in a bit field, embedding a data item in a structure, embedding a data item in a union, using platform-specific declarations in the data declaration, defining the scope and storage of the data, declaring data using arbitrary C types, and accessing data through function calls.

DETAILED DESCRIPTION

Figure 1:
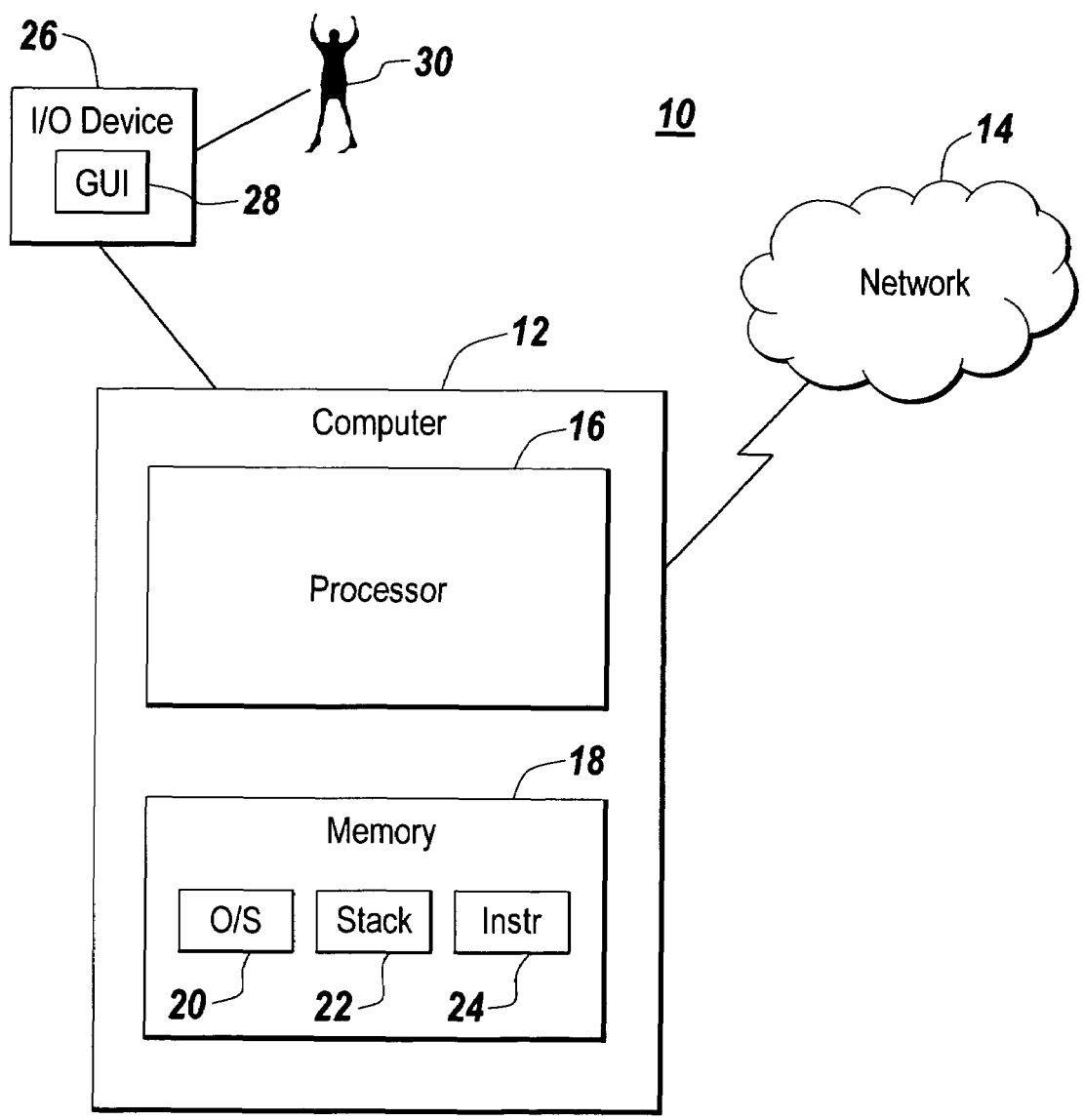
FIG. 1 shows a processing system.

FIG. 1 shows a processing system 10. The processing system 10 includes a computer 12, such as a personal computer (PC). Computer 12 may be connected to a network 14, such as the Internet, that runs TCP/IP (Transmission Control Protocol/Internet Protocol) or another suitable protocol. Connections may be via Ethernet, wireless link, or telephone line.

Computer 12 contains a processor 16 and a memory 18. Memory 18 stores an operating system ("OS") 20 such as Windows98® or Linux, a TCP/IP protocol stack 22 for communicating over network 14, and machine-executable instructions 24 executed by processor 16 to perform a code generation process 50 below. Computer 12 also includes an input/output (I/O) device 26 for display of a graphical user interface (GUI) 28 to a user 30.

Figure 2:
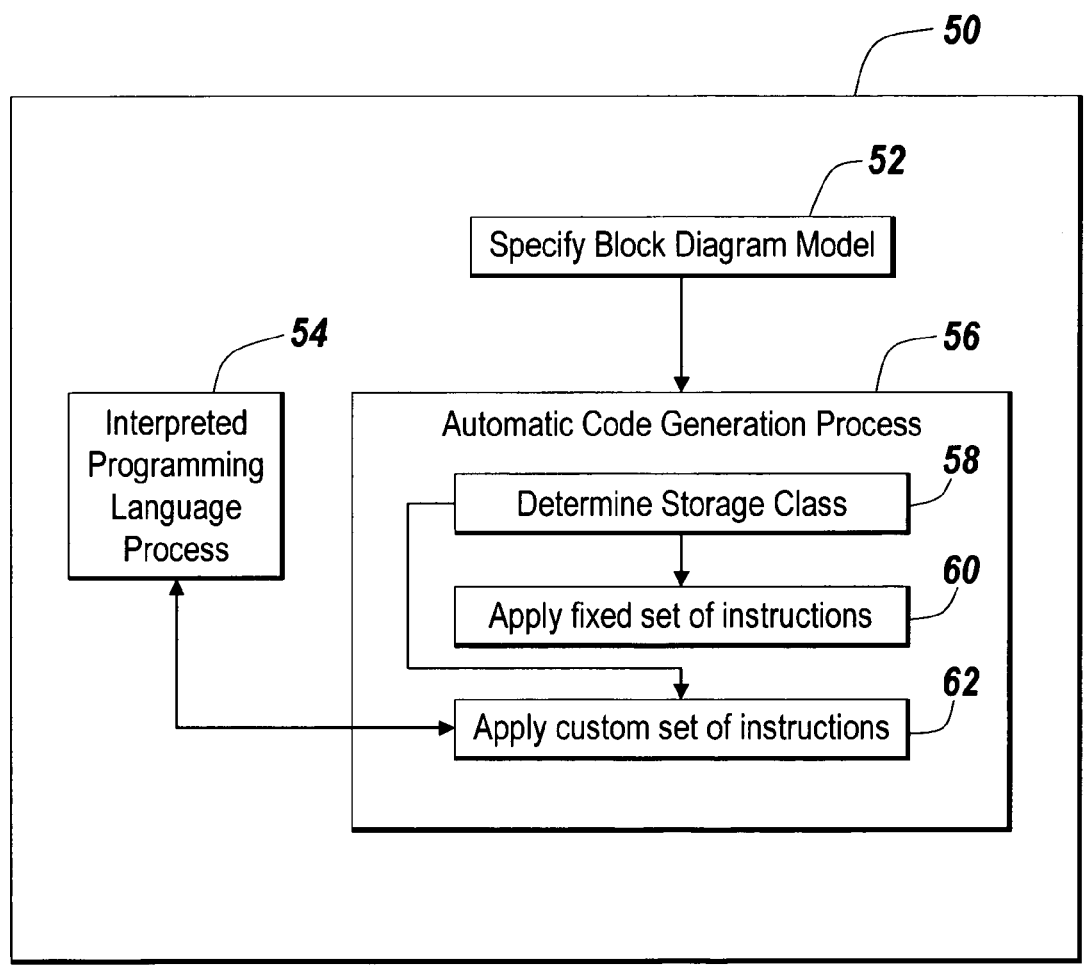
FIG. 2 shows a code generation process.

Referring to FIG. 2, a code generation process 50 includes specifying 52 a model of a dynamic system to be simulated and displayed on a graphical user interface. The model graphically depicts the time-dependent mathematical relationships among the system's inputs, states and outputs. A model-based design environment is an executable specification that can be translated to target ready code, deployable on hardware or software platforms. Platforms include CPUs, real-time operating systems, custom ASICs, and hardware FPGAs. The model includes a set of symbols, called blocks, interconnected by signal lines that carry signals. Blocks are functional entities that operate on signal values contained in the signal lines. Each block can have zero or more input signal lines and zero or more output signal lines. Blocks can have states. A state is a variable that determines a block's output and whose current value is a function of the previous values of the block's states and/or inputs.

In the model, signals carried on the signal lines are the streams of values that appear at the output ports of blocks. It is useful to think of signals as values traveling along the lines that connect the blocks in the model. The signal can have a wide range of attributes, such as name, data type (e.g., 8-bit, 16-bit or 32-bit integer), numeric type (e.g., real or complex), and dimensionality (e.g., one-dimension array, two-dimension array or multi-dimensional array).

Each item of data in the model is defined to have a data storage class. A data storage class contains the instructions that define how a code generator is to produce code when a reference to an item of data belonging to that data storage class is encountered in the model. Data storage classes may be either pre-defined or custom. Pre-defined data storage classes represent those data storage classes inherent within a modeling system. Pre-defined data storage classes are not capable of modification by a user and represent an instruction or set of instructions for each type of reference to the data.

Custom data storage classes are not inherent to the modeling system and are generated by an interpreted programming language process 54. Using the interpreted programming language process 54, the user specifies a custom data storage class by specifying a set of instructions for each type of reference to the data. This set defines the data storage class. Specifically, the custom data storage class is characterized by the set of instructions defined by the user that detail how to generate software source code for each type of reference to data that is of that class. The user may then specify that custom data storage class as the item's storage class. Because the user specifies and defines these instructions, the possible variations in the software source code to be generated are unlimited. The instructions corresponding to a given custom data storage class may be a function of the set of items that are defined to be of that class, so that the mechanism is self-referential.

In an example, the interpreted programming language process 54 represents an ASCII-based target language compiler as powerful as a C programming language compiler.

Once the block diagram model is specified 52, the process 50 executes an automatic code generation process 56. For each data item specified 52 in the block diagram model, the automatic code generation process 56 determines 58 the storage class of the data item. If the data storage class is pre-defined, the automatic code generation process 56 applies 60 a fixed set of instructions that are part of the automatic code generation process' implementation to generate code for each type of reference to the item. If the data storage class is determined as custom, the automatic code generation process 56 accesses 62 an external set of user-defined instructions associated with the custom data storage class from the interpreted programming language process 54 through an application programming interface (API) to generate code for each type of reference to the item.

Figure 3:
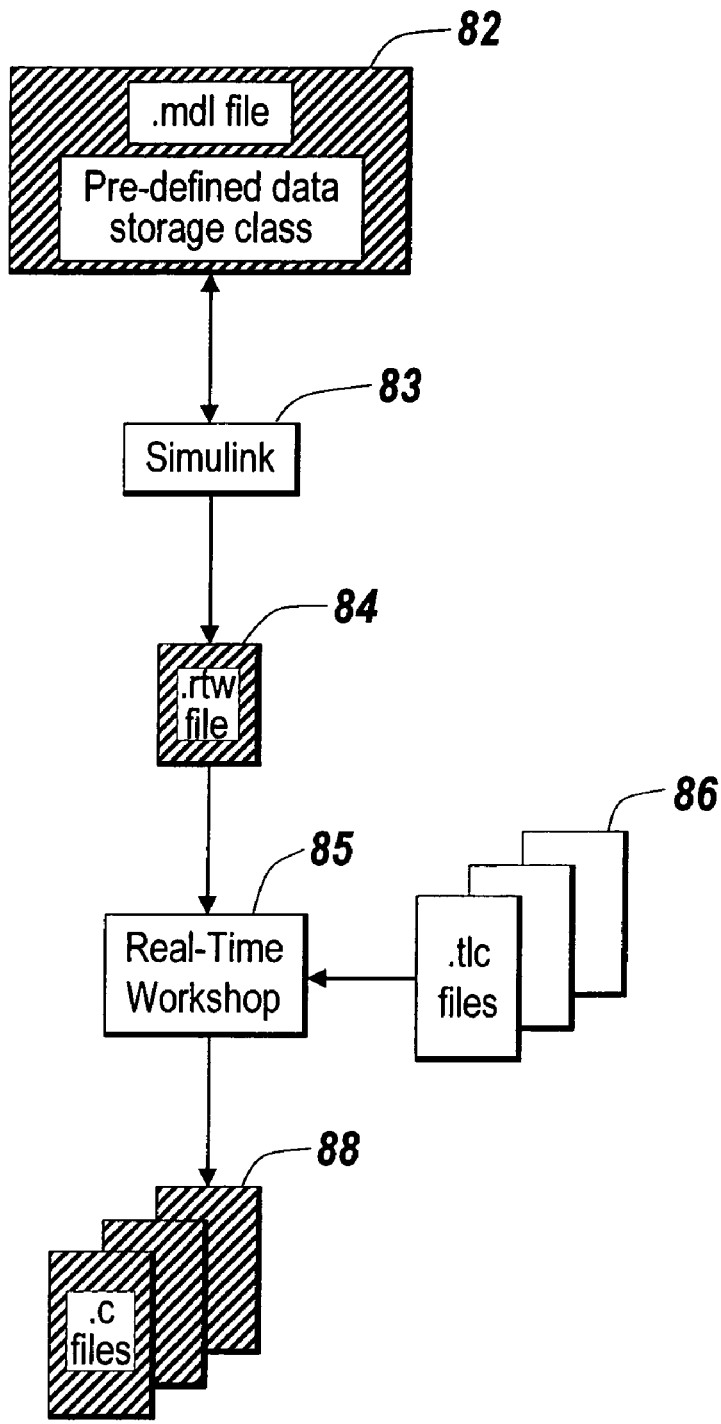
FIG. 3 shows a code generation process used in conjunction with Real-Time Workshop.

Referring to FIG. 3, an example of the code generation process 80 can be described in conjunction with Real-Time Workshop from MathWorks, Inc. of Natick, Mass. Real-Time Workshop is a set of tools that generate code from Simulink models for targeted real-time systems. Static, fixed components of the code generation process 80 are white, while model-specific components are cross. A model is stored in an ".mdl" model file 82. Simulink 83 translates the model file 82 into a Real-Time Workshop ".rtw" file 84. Simulink is a MathWorks, Inc. software package for modeling, simulating, and analyzing dynamic systems. Simulink supports linear and nonlinear systems, modeled in continuous time, sampled time, or a hybrid of the two. Systems can also be multi-rate, i.e., have different parts that are sampled or updated at different rates. The .rtw file 84 is, in a sense, a compiled version of the .mdl file 82. Real-Time Workshop 85 takes the .rtw file 84, and together with .tlc files 86 (i.e., pre-defined data storage classes) supplied by MathWorks, produces C programming language code 88 corresponding to the model. During the code generation process 80, tokens in the .tlc files are replaced with strings defined in the .rtw file 84.

Figure 4:
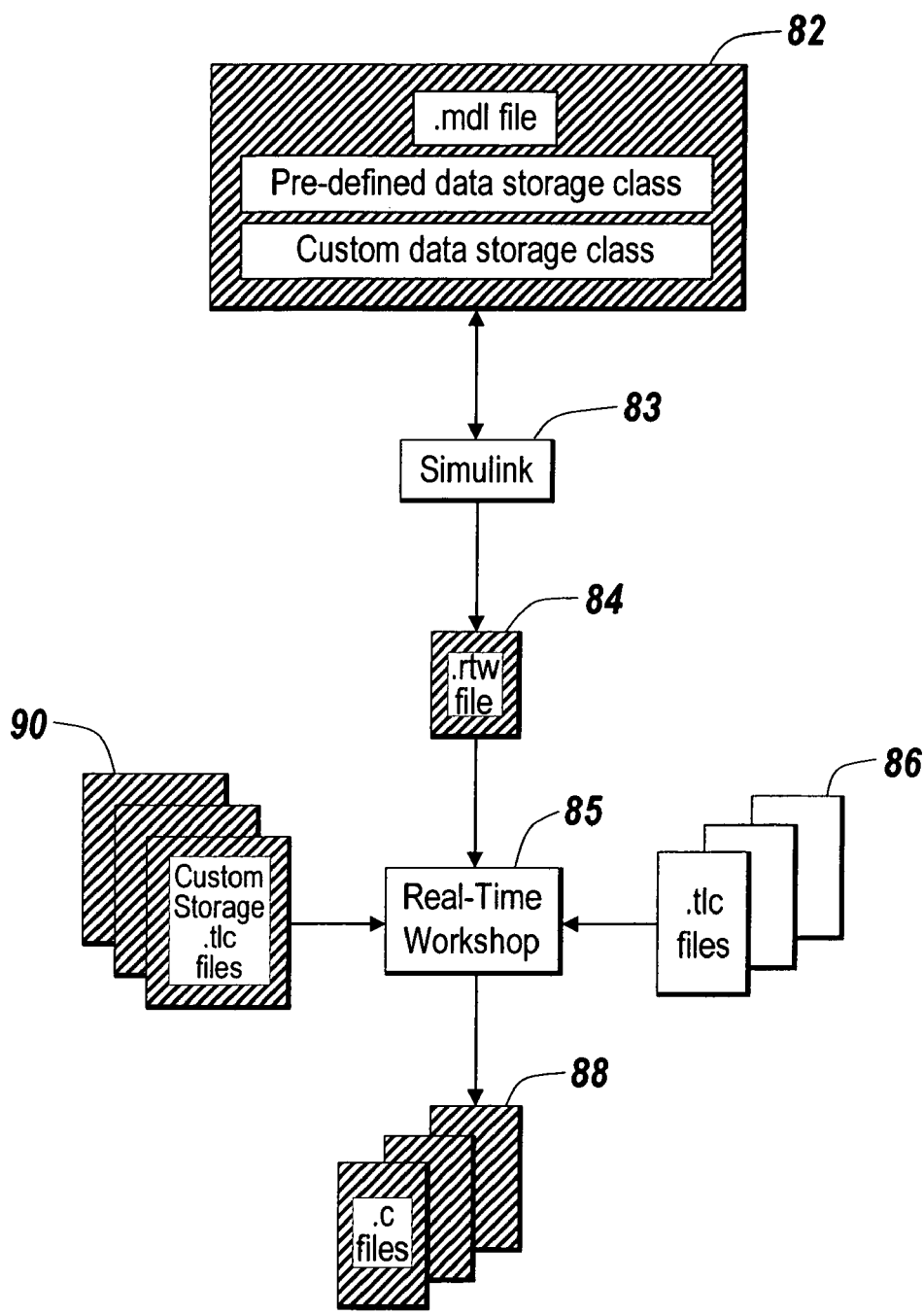
FIG. 4 shows a code generation process used in conjunction with Real-Time Workshop.

Referring to FIG. 4, the code generation process 80 of FIG. 3 incorporates the technique of custom data storage classes. As depicted in FIG. 4, user-defined .tlc files 90 augment the code generation mechanism supplied by Math Works, to provide a user-defined, programmatic specification for tailoring the code 88 generated for data. Customized code generation occurs when Real-Time Workshop 85 encounters a data record in the .rtw file 84 that instructs it to utilize a user-defined .tlc file 90 (i.e., custom data storage class) instead of the MathWorks-supplied .tlc file 86 (i.e., pre-defined data storage class) to generate code corresponding to a reference to data. More specifically, when an item of data is defined to have a custom data storage class, instructions associated with that data storage class are used to generate code corresponding to the data, at each point in the code generation process where the data is referenced.

Process 50 is not limited to use with the hardware/software configuration of FIG. 1; it may find applicability in any computing or processing environment. Process 50 may be implemented in hardware (e.g., an ASIC {Application-Specific Integrated Circuit} and/or an FPGA {Field Programmable Gate Array}), software, or a combination of hardware and software.

Processes 50 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 50.

Process 50 may also be implemented as a computer-readable storage medium, configured with a computer program, where, upon execution, instructions in the computer program cause the computer to operate in accordance with process 50.

Further aspects, features and advantages will become apparent from the following.

What is claimed is:

1. A computer-implemented method for generating code, the method comprising:

specifying a block diagram model, the block diagram model including data having internal pre-defined data storage classes and an external custom data storage class associated with data items of the block diagram model, the external custom data storage class characterized by instructions defined by a user for generating code for each type of reference to data items of the external custom data storage class in the block diagram model; and generating software code for the block diagram model with a code generator using the internal predefined data storage classes and the external custom data storage class for data items of the block diagram, said generating comprising:

applying a fixed set of software instructions inherent in the code generator which characterize the pre-defined data storage classes inherent in the code generator to generate code for a reference to the pre-defined data storage classes; and applying an external set of software instructions which are defined by a user and which characterize the external custom data storage class to generate code for a reference to the external custom data storage class, the external set of one or more software instructions being external to the code generator.

2. The method of claim 1 further comprising:
compiling the software code into executable code specific to a target processor.

3. The method of claim 1 wherein the external set is accessed by the code generator through an application program interface (API).

4. The method of claim 3 wherein the application program interface includes an interpreted programming language.

5. The method of claim 1 wherein generating further comprises a data definition process.

6. The method of claim 5 wherein the data definition process comprises receiving a set of one or more software instructions for each reference to one or more types of the external custom data storage class.

7. The method of claim 1 wherein the software code is in a C programming language.

8. A computer implemented system for generating code from a block diagram model, the system comprising computer executable instructions for:

a visual display displaying a graphical user interface that enables a user to enter an input to an application programming interface (API) for generating an external custom data storage class via an interpreted programming language, the external custom data storage class characterized by instructions defined by the user for generating code for each type of reference to data items of the external custom data storage class in the block diagram model; and a storage device to store an automatic code generator, the automatic code generator using the API to obtain an external set of one or more software instructions from the user input to generate software code corresponding to data declared as the external custom data storage class in the block diagram model, the code generator applying a fixed set of software instructions inherent in the code generator which characterize the pre-defined data storage classes inherent in the code generator to generate code for a reference to the pre-defined data storage classes, and the code generator applying the external set of one or more software instructions which characterize the external custom data storage class to generate code for a reference to the external custom data storage class, the external set of one or more software instructions being external to the code generator.

9. The system of claim 8 wherein the interpreted programming language is ASCII-based.

10. The system of claim 8, wherein the storage device further stores a set of pre-defined instructions inherent in the automatic code generator to generate software code corresponding to data declared as an internal pre-defined data storage class in the automatic code generator.

11. The system of claim 10 wherein the software code comprises program instructions representative of a C programming language.

12. The system of claim 10, wherein the storage device further stores a compiler for compiling the code for a target processor.

13. A computer program product residing on a computer readable medium having instructions stored thereon which, when executed by the processor, cause the processor to:

specify a block diagram model, the block diagram model including data having internal pre-defined data storage classes and an external custom data storage class associated with data items of the block diagram model, the external custom data storage class characterized by instructions defined by a user for generating code for each type of reference to data items of the external custom data storage class in the block diagram model; and generate software code for the block diagram model with a code generator using the internal predefined data storage classes and the external custom data storage class for data items of the block diagram, said generating comprising:

applying a fixed set of software instructions inherent in the code generator which characterize the pre-defined data storage classes inherent in the code generator to generate code for a reference to the pre-defined data storage classes, and applying an external set of one or more software instructions which are defined by a user and which characterize the external custom data storage class to generate code for a reference to the external custom data storage class, the external set of one or more software instructions being external to the code generator.

14. The computer program product of claim 13 wherein the computer readable medium is a random access memory (RAM).

15. The computer program product of claim 13 wherein the computer readable medium is read only memory (ROM).

16. The computer program product of claim 13 wherein the computer readable medium is a hard disk drive.

* * * * *

UNITED STATES PATENT AND TRADEMARK OFFICE
CERTIFICATE OF CORRECTION

| | |
|---|---|
| PATENT NO. | : 7,367,012 B2 |
| APPLICATION NO. | : 09/876487 |
| DATED | : April 29, 2008 |
| INVENTOR(S) | : Peter Szpak et al. |

Page 1 of 1

It is certified that error appears in the above-identified patent and that said Letters Patent is hereby corrected as shown below:

In the specification, in the summary section, at column 1, line number 35, in the printed patent, please change "classes and external" to --classes, and external--

In the specification, in the summary section, at column 1, line number 50, in the printed patent, please change "(API)" to --("API")--

In the specification, in the summary section, at column 1, line number 58, in the printed patent, please change "includes an" to --includes, an--

In the specification, in the summary section, at column 2, line number 21, in the printed patent, please change "In this manner the" to --In this manner, the--

In the specification, in the summary section, at column 2, line number 25, in the printed patent, please change "objects since" to --objects, since--

In the specification, in the summary section, at column 2, line number 39, in the printed patent, change "include embedding" to --include, embedding--

Signed and Sealed this

Fifth Day of August, 2008

JON W. DUDAS
*Director of the United States Patent and Trademark Office*